US012357142B2

(12) United States Patent
Boeker et al.

(10) Patent No.: US 12,357,142 B2
(45) Date of Patent: Jul. 15, 2025

(54) METHOD FOR AUTOMATICALLY ASCERTAINING CLEANING, MAINTENANCE AND/OR REPAIR INFORMATION FOR A MOTOR-DRIVEN TREATMENT TOOL AND SYSTEM FOR AUTOMATICALLY ASCERTAINING CLEANING, MAINTENANCE AND/OR REPAIR INFORMATION FOR A MOTOR-DRIVEN TREATMENT TOOL

(71) Applicant: Andreas Stihl AG & Co. KG, Waiblingen (DE)

(72) Inventors: Robert Boeker, Waiblingen (DE); Joerg Blaesi, Ebersbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 881 days.

(21) Appl. No.: 17/644,741

(22) Filed: Dec. 16, 2021

(65) Prior Publication Data

US 2022/0192450 A1 Jun. 23, 2022

(30) Foreign Application Priority Data

Dec. 17, 2020 (EP) .................................... 20214890

(51) Int. Cl.

| | |
|---|---|
| ***A47L 9/28*** | (2006.01) |
| ***B25F 5/00*** | (2006.01) |
| ***B27B 17/00*** | (2006.01) |
| ***B27G 19/00*** | (2006.01) |

(52) U.S. Cl.

CPC ................ *A47L 9/281* (2013.01); *B25F 5/00* (2013.01); *B27B 17/00* (2013.01); *B27G 19/003* (2013.01)

(58) Field of Classification Search

CPC ..................................................... A47L 9/2815

See application file for complete search history.

(56) References Cited

U.S. PATENT DOCUMENTS

| | | | | |
|---|---|---|---|---|
| 11,069,082 | B1 * | 7/2021 | Ebrahimi Afrouzi .. | H04N 23/56 |
| 11,651,334 | B1 * | 5/2023 | Megyese ............ | G06Q 30/0208 705/308 |

(Continued)

FOREIGN PATENT DOCUMENTS

| | | | |
|---|---|---|---|
| DE | 10 2017 203 685 | A1 | 9/2018 |
| DE | 20 2018 105 999 | U1 | 12/2018 |
| EP | 3 424 301 | A1 | 1/2019 |

OTHER PUBLICATIONS

German-language Extended European Search Report issued in European Application No. 20214890.4 dated Jun. 9, 2021 with partial English translation (five (5) pages).

*Primary Examiner* — Benjamin O Dulaney

(74) *Attorney, Agent, or Firm* — Crowell & Moring LLP

(57) ABSTRACT

A method and system automatically determine cleaning, maintenance and/or repair information for a motor-driven treatment tool, wherein the treatment tool comprises a residue, able to be detected externally optically, caused during the operation of the treatment tool. The method involves the steps of: optically detecting the residue; classing the detected residue in accordance with a type of the residue; determining the cleaning, maintenance and/or repair information based on the classing; and outputting the determined cleaning, maintenance and/or repair information.

19 Claims, 6 Drawing Sheets

(56) References Cited

U.S. PATENT DOCUMENTS

| | | | | |
|---|---|---|---|---|
| 2014/0237756 | A1* | 8/2014 | Conrad | A47L 9/327 15/329 |
| 2019/0011418 | A1* | 1/2019 | Eppinger | B25F 5/00 |
| 2020/0126319 | A1 | 4/2020 | Russ et al. | |
| 2020/0168339 | A1* | 5/2020 | Correnti | G16H 50/30 |
| 2021/0008603 | A1* | 1/2021 | Takahashi | A01D 34/008 |
| 2021/0312793 | A1* | 10/2021 | Valentini | B25F 5/02 |
| 2021/0327045 | A1* | 10/2021 | Moriya | G06T 7/0004 |

* cited by examiner

METHOD FOR AUTOMATICALLY ASCERTAINING CLEANING, MAINTENANCE AND/OR REPAIR INFORMATION FOR A MOTOR-DRIVEN TREATMENT TOOL AND SYSTEM FOR AUTOMATICALLY ASCERTAINING CLEANING, MAINTENANCE AND/OR REPAIR INFORMATION FOR A MOTOR-DRIVEN TREATMENT TOOL

CROSS REFERENCE TO RELATED APPLICATION

This application claims priority under 35 U.S.C. § 119 from European Patent Application No. 20214890.4, filed Dec. 17, 2020, the entire disclosure of which is herein expressly incorporated by reference.

BACKGROUND AND SUMMARY OF THE INVENTION

The invention relates to a method for automatically ascertaining cleaning, maintenance and/or repair information for a motor-driven treatment tool and to a system for automatically ascertaining cleaning, maintenance and/or repair information for a motor-driven treatment tool.

The invention is based on the problem of providing a method for automatically ascertaining cleaning, maintenance and/or repair information for a motor-driven treatment tool and a system for automatically ascertaining cleaning, maintenance and/or repair information for a motor-driven treatment tool, in particular each having improved properties.

The invention solves this problem by providing a method and a system in accordance with the independent claims. Advantageous developments and/or embodiments of the invention are described in the dependent claims.

The method according to the invention is designed or configured or intended to automatically ascertain or determine cleaning, maintenance and/or repair information, in particular a content of the cleaning, maintenance and/or repair information, for a motor-driven treatment tool or treatment device. The treatment tool has or comprises a residue, able to be optically detected from the outside or externally, in particular to the treatment tool, caused during the operation, in particular by the operation, of the treatment tool. The method comprises or involves the steps of: a) optically detecting, in particular automatically detecting, the residue, in particular on the treatment tool and/or externally. b) Classing, in particular automatically classing, or classifying or categorizing or identifying the in particular optically detected residue in accordance with a type or a category of the residue. c) Determining, in particular automatically determining, the cleaning, maintenance and/or repair information based on the class or the classing or the classed type. d) Outputting, in particular automatically outputting, the determined cleaning, maintenance and/or repair information, in particular to or for a user and/or a repairer of the treatment tool.

This, in particular the optical detection of the residue and the classing thereof in accordance with the type of residue, makes it possible to indirectly determine the cleaning, maintenance and/or repair information. In other words this means that the cleaning, maintenance and/or repair information does not need to be determined directly, in particular by dismantling the treatment tool. This thus allows temporally fast and/or simple determination of the cleaning, maintenance and/or repair information.

In addition or as an alternative, this, in particular the outputting of the determined cleaning, maintenance and/or repair information, means that cleaning, maintenance and/or repair of the treatment tool is able to be performed quickly in time, in particular and thus inexpensively, in particular by the user and/or the repairer.

Again in addition, this, in particular the cleaning information, allows the user to identify that cleaning that is possibly able to be performed by the user may, in particular initially, be sufficient, and/or this, in particular the maintenance and/or repair information, allows the user to identify that maintenance and/or repair, which should or may possibly not be performed by the user and/or should and/or need/needs to be performed by the repairer, may be necessary.

Again in addition or as an alternative, this, in particular the cleaning, maintenance and/or repair information, makes it possible to check on the treatment tool or to care for it in a timely manner, in particular at a time before a larger cleaning operation, a larger maintenance operation and/or a larger repair operation may be necessary for the treatment tool, in particular due to non-timely or excessively late checking or care.

The treatment tool may in particular be a ground-guided and/or manually guided, in particular hand-held, treatment tool. Manually guided, in particular hand-held, treatment tool may in particular mean that the treatment tool may have a mass of at most 50 kg (kilograms), in particular of at most 20 kg, in particular of most 10 kg, in particular of at most 5 kg, and/or of at least 1 kg, in particular of at least 2 kg. In addition or as an alternative, the treatment tool may be a gardening, forestry and/or construction tool and/or a cutting tool.

The residue may exhibit or have a minimum circumference or a minimum extent. In addition or as an alternative, the residue or its type may be such that it may be made possible to determine the cleaning, maintenance and/or repair information. In other words the residue or its type may be relevant to cleaning, maintenance and/or repair of the treatment tool.

Based on the residue or its type or its classing, it is possible to ascertain the cleaning, maintenance and/or repair information, in particular the content of the cleaning, maintenance and/or repair information, and based on a different type of residue or a different type or a different classing, it is possible to ascertain different cleaning, maintenance and/or repair information, in particular a different content of the cleaning, maintenance and/or repair information.

Step a) or the optical detection may involve, in particular be, recording an image of the residue. In addition or as an alternative, step b) or the classing may be performed by way of image recognition, in particular feature extraction and/or reduction, and/or image comparison and/or an in particular electronic database or a cloud and/or an artificial neural network. Again in addition or as an alternative, step c) or the determination may be performed by way of an in particular electronic database or a cloud. Again in addition or as an alternative, the output, in particular in step d), may involve, in particular be, an acoustic and/or optical output, in particular a display.

Step b) may be performed after step a) in time. In addition or as an alternative, step c) may be performed after step b) in time. Again in addition or as an alternative, step d) may be performed after step c) in time.

In a development of the invention, the treatment tool, in particular a motorized drive system of the treatment tool, has or comprises various or different types of components. Depending on the type of the residue and/or classing, the cleaning, maintenance and/or repair information, in particular the content of the cleaning, maintenance and/or repair information, differs in that the cleaning, maintenance and/or repair information is relevant, in particular type-specific, to in particular only one of the in particular types of components. This means that cleaning, maintenance and/or repair of the treatment tool is able to be targeted and effective. In particular respective different types of components, in particular typically, may require cleaning, maintenance and/or repair, in particular for different types of residues. In addition or as an alternative, the cleaning, maintenance and/or repair information may be relevant, in particular type-specific, to one of the in particular types of components for a residue or its type or its classing, and the cleaning, maintenance and/or repair information may be relevant, in particular type-specific, to a different one of the in particular types of components for a different type of residue or a different type or different classing. Again in addition or as an alternative, the motorized drive system may be a combustion engine drive system and/or an electric motor drive system.

In an embodiment of the invention, the different types of components comprise or include a ventilation and/or cooling component, in particular a preseparator or a prefilter on a fan wheel and/or a heat sink, in particular cooling fins, on an engine cylinder, a valve and/or sealing component, in particular a fuel inlet valve and/or a radial shaft seal, and/or an air guidance component, in particular on an air inlet, in particular for fresh air, and/or an engine cylinder and/or a silencer. Such a component may, in particular typically, be impacted by a residue, in particular on and/or in the component, of the same type as the externally optically detectable residue. The components may in particular be referred to as component types. In addition or as an alternative, the engine cylinder may be an engine cylinder of a combustion drive engine of the motorized drive system, in particular of the combustion engine drive system. Again in addition or as an alternative, the air guidance component may be a cooling air guidance component.

In a development of the invention, the treatment tool, in particular a motorized drive system of the treatment tool, has or comprises a number, in particular a multiplicity, of components. The number of components is not able to be externally optically detected or not visible in an intended operating or treatment state of the treatment tool, in particular is at least partially or completely concealed by a housing of the treatment tool. The cleaning, maintenance and/or repair information is relevant, in particular only, to one of the number of components. The method makes it possible, based on the residue, in particular on the treatment tool and/or in a manner able to be detected externally optically, to determine the cleaning, maintenance and/or repair information relevant to one of the number of components, in particular without dismantling the housing. This thus allows temporally fast and/or simple determination of the cleaning, maintenance and/or repair information. The motorized drive system may in particular be a combustion engine drive system and/or an electric motor drive system. In addition or as an alternative, the housing may be an external housing. Again in addition or as an alternative, the residue may be on the housing. Again in addition or as an alternative, one of the number of components may be impacted by a residue, in particular on and/or in the component, of the same type as the externally optically detectable residue.

In a development of the invention, the residue of a material of a workpiece is caused by treatment of the workpiece by way of the treatment tool. The workpiece may in particular be a piece of a plant, in particular a tree and/or a piece of wood.

In a development, in particular an embodiment, of the invention, the residue is from a set of different types of residues. The different types of residues comprise or include a sap residue, in particular a resin, in particular in connection with a plant-based dust, an abrasive dust residue, in particular a mineral dust, and/or a plant-based fibre and/or plant-based chip residue, in particular in connection with dirt collected by a plant. Such a residue of the same type as the externally optically detectable residue may, in particular typically, impact the treatment tool, in particular one of its various types of components, in particular on and/or in the component. A residue of the same type as the sap residue may in particular impact the ventilation and/or cooling component, in particular as far as the engine cylinder and/or at same. In addition or as an alternative, a residue of the same type as the abrasive dust residue may impact the valve and/or sealing component. Again in addition or as an alternative, a residue of the same type as the plant-based fibre and/or plant-based chip residue may impact the air guidance component, in particular at the engine cylinder and/or away therefrom. Again in addition or as an alternative, the plant-based dust may be a sawdust. Again in addition or as an alternative, the plant-based fibre and/or plant-based chip residue may be a wood fibre and/or woodchip residue. Again in addition or as an alternative, the cleaning information may be determined based on the sap residue and/or the plant-based fibre and/or plant-based chip residue. Again in addition or as an alternative, the maintenance and/or repair information may be determined based on the abrasive dust residue. Again in addition or as an alternative, the residues may be referred to as residue types.

In a development of the invention, the treatment tool is a saw, a pruner, a brush cutter, a hedge trimmer, a hedge cutter, a blower, a leaf blower, a set of pruning shears, an abrasive cutter, a sweeper, a sweeper roller, a sweeping brush, a lawnmower, a scarifier, a grass trimmer, a shredder, a stonecutter, a pressure washer or a spraying device and/or sprayer. Such a treatment tool may, in particular typically, comprise the residue, able to be detected externally optically, caused during the operation of the treatment tool.

In a development of the invention, the method comprises or involves the step of: ascertaining, in particular automatically ascertaining and/or acquiring, a type or a kind of the treatment tool, in particular performed by the user and/or the repairer. Step c) comprises or involves: determining the cleaning, maintenance and/or repair information based on the ascertained type of the treatment tool. Ascertaining the type of the treatment tool may in particular involve: selecting, in particular only, the type of the treatment tool from a set of various types of motor-driven treatment tools, in particular performed by the user and/or the repairer.

In a development of the invention, the method comprises or involves the step of: ascertaining, in particular automatically ascertaining and/or acquiring, diagnostic data, in particular a value of the diagnostic data and/or fault data, of the treatment tool. The ascertained diagnostic data are complementary to the detected residue and/or the classing or independent of said residue and/or said classing. Step c) comprises or involves: determining the cleaning, maintenance and/or repair information by way of in particular automatically and/or logically linking the ascertained diagnostic data and the classing. This allows particularly accurate determination of the cleaning, maintenance and/or repair information. The diagnostic data may in particular be such that it may be made possible to determine the cleaning, maintenance and/or repair information. In other words the diagnostic data may be relevant to cleaning, maintenance and/or repair of the treatment tool. In addition or as an alternative, based on the diagnostic data, it is possible to ascertain the cleaning, maintenance and/or repair information, in particular the content of the cleaning, maintenance and/or repair information, and based on different diagnostic data, it is possible to ascertain different cleaning, maintenance and/or repair information, in particular a different content of the cleaning, maintenance and/or repair information. Again in addition or as an alternative, the diagnostic data may be stored. Again in addition or as an alternative, the diagnostic data may be transmitted wirelessly and/or be ascertained and/or transmitted without dismantling the treatment tool, in particular the housing.

In a development, in particular an embodiment, of the invention, step c) comprises or involves: selecting, in particular automatically selecting, the cleaning, maintenance and/or repair information, in particular the content of the cleaning, maintenance and/or repair information, from a set of different cleaning, maintenance and/or repair information, in particular different contents of the cleaning, maintenance and/or repair information. The cleaning, maintenance and/or repair information is in each case assigned a type of a residue from a set of different types of residues, in particular and a type of treatment tool from a set of different types of treatment tools, and/or diagnostic data, in particular a value of the diagnostic data, from a set of different diagnostic data, in particular different values of the diagnostic data. This makes it possible to determine the cleaning, maintenance and/or repair information based on the classing, in particular and the ascertained type of the treatment tool in particular and/or the ascertained diagnostic data.

In an embodiment of the invention, the method comprises or involves the steps of: ascertaining, in particular automatically ascertaining and/or acquiring, effective or effectual or useful or helpful, in particular actual, cleaning, maintenance and/or repair information, in particular performed by the user and/or the repairer, in particular at the same time as and/or at a time after the cleaning, the maintenance and/or the repair. Assigning, in particular automatically assigning, the type of the residue to the ascertained effective cleaning, maintenance and/or repair information for a next, in particular in time, performance of the method. This makes it possible to fine-tune the method, in particular over time. Ascertaining the effective cleaning, maintenance and/or repair information may in particular involve confirming or changing the determined, in particular and output, cleaning, maintenance and/or repair information.

In a development, in particular an embodiment, of the invention, the cleaning, maintenance and/or repair information has or comprises a cleaning, maintenance and/or repair operation instruction and/or a, in particular possible or probable, replacement part, in particular a name of the replacement part, for the treatment tool and/or a, in particular possible or probable, fault symptom, in particular a name of the fault symptom, and/or a, in particular possible or probable, fault cause, in particular a name of the fault cause, of the treatment tool and/or the, in particular possible or probable, relevant component, in particular a name of the component. This means that maintenance and/or repair of the treatment tool is able to be specialized, targeted and effective.

The in particular electrical system according to the invention is designed or configured for automatically ascertaining, in particular the, cleaning, maintenance and/or repair information for a motor-driven, in particular the motor-driven, treatment tool. The treatment tool comprises a, in particular the, residue, able to be detected externally optically, caused during the operation of the treatment tool. The system comprises or comprises an in particular electrical optical detection unit, an in particular electrical classing unit, an in particular electrical determination unit and an in particular electrical output unit. The optical detection unit is designed or configured to optically detect the residue. The classing unit is designed or configured to class the detected residue in accordance with a, in particular the, type of the residue. The determination unit is designed or configured to determine the cleaning, maintenance and/or repair information based on the classing. The output unit is designed or configured to output the determined cleaning, maintenance and/or repair information.

The system may enable the same advantages as the method mentioned above.

The system may in particular be designed or configured to in particular automatically perform the method.

The detection unit may comprise, in particular be, an in particular electrical and/or digital camera.

The classing unit may comprise an in particular electrical image recognition and/or image comparison unit and/or an in particular electronic database or a cloud. In addition or as an alternative, the classing unit may comprise a computing and/or storage unit.

The determination unit may comprise an in particular electronic database or a cloud. In addition or as an alternative, the determination unit may comprise a computing and/or storage unit.

The output unit may comprise a sound generator, in particular a loudspeaker, and/or a display.

The detection unit, the classing unit, the determination unit and/or the output unit may, in particular each, be formed separately from the treatment tool. In other words the detection unit, the classing unit, the determination unit and/or the output unit, in particular each, do/does not need to be part of the treatment tool.

In a development of the invention, the system comprises or comprises an in particular electrical mobile, in particular portable or hand-held, device. The device comprises or comprises the optical detection unit and/or the output unit. The mobile ascertainment device enables carrying in a user-friendly manner. The mobile device may in particular comprise, in particular be, a smartphone and/or a smartwatch. In addition or as an alternative, the mobile device may be formed separately from the treatment tool. In other words the mobile device does not need to be part of the treatment tool. Again in addition or as an alternative, the mobile device may comprise the classing unit and/or the determination unit.

In a development of the invention, the system comprises or comprises the treatment tool and/or a, in particular the, replacement part for the treatment tool.

Further advantages and aspects of the invention arise from the claims and from the following description of preferred exemplary embodiments of the invention, which are explained below on the basis of the figures.

DETAILED DESCRIPTION OF THE DRAWINGS

Figure 1:
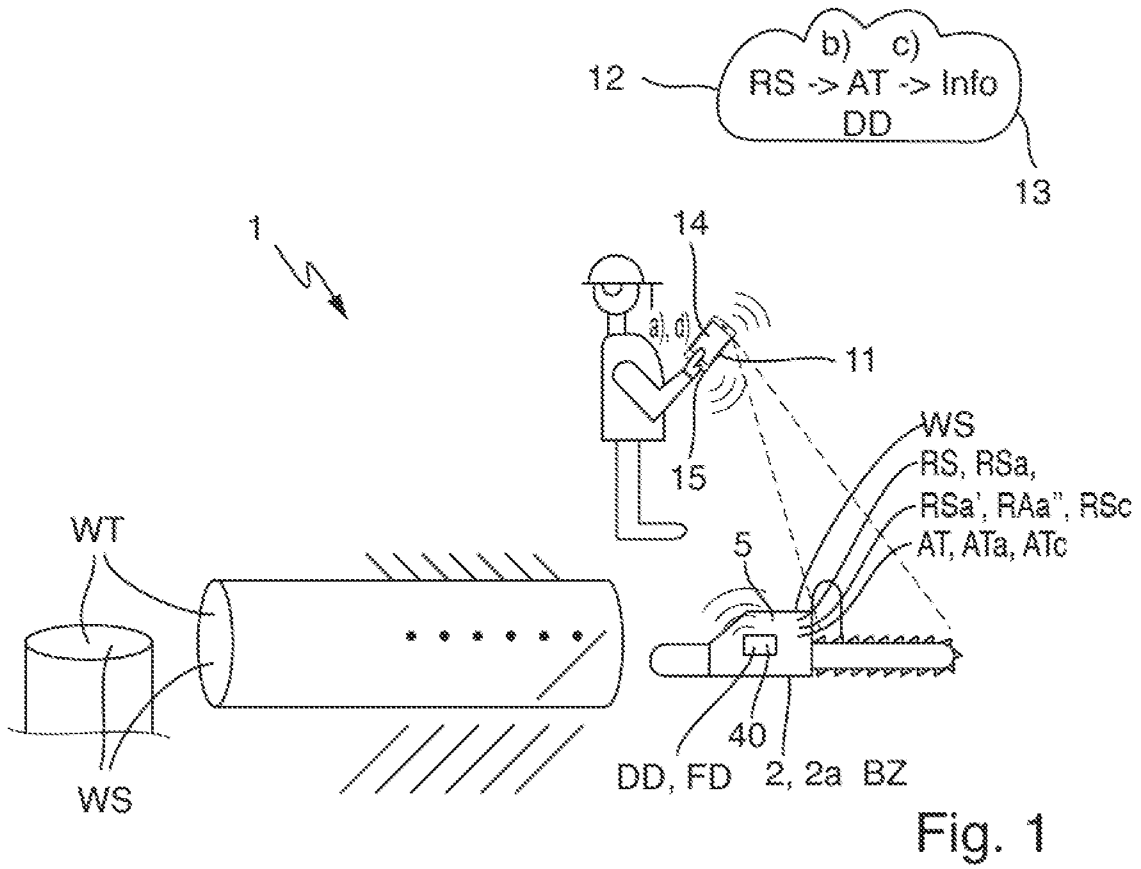
FIG. 1 shows a schematic view of a method according to an embodiment of the invention and of a system according to an embodiment of the invention.

FIGS. 1 to 4 show a system 1 and a method for automatically ascertaining cleaning, maintenance and/or repair information Info for a motor-driven treatment tool 2, as shown in FIGS. 1 and 4 to 12. The treatment tool 2 comprises a residue RS, able to be detected externally optically, caused during the operation of the treatment tool 2.

The system 1 comprises an optical detection unit 11, a classing unit 12, a determination unit 13 and an output unit 14, two output units 14 in the exemplary embodiment that is shown. The optical detection unit 11 is designed to optically detect, in particular optically detects, the residue RS. The classing unit 12 is designed to class, in particular classes, the detected residue RS in accordance with a type AT of the residue RS. The determination unit 13 is designed to determine, in particular determines, the cleaning, maintenance and/or repair information Info based on the classing. The output unit 14 is designed to output, in particular outputs, the determined cleaning, maintenance and/or repair information Info.

Figure 2:
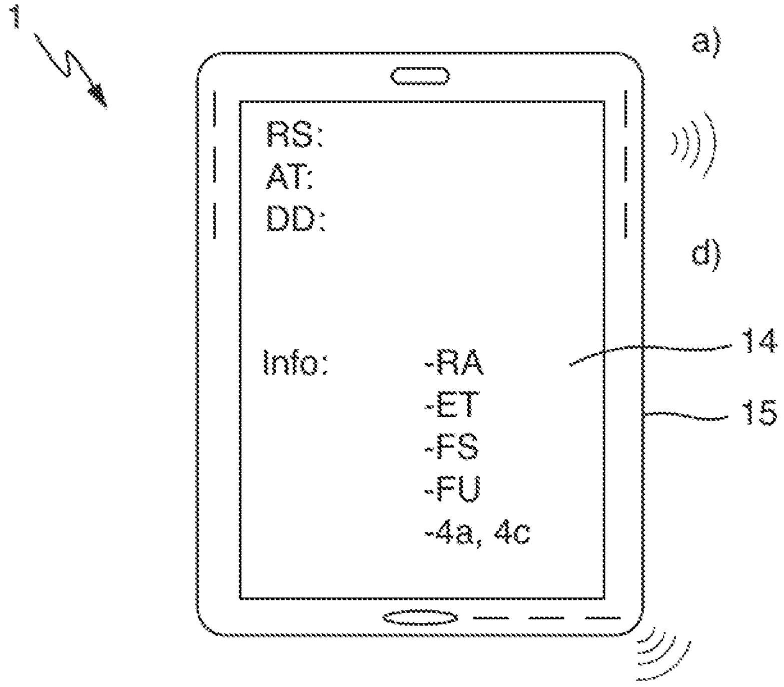
FIG. 2 shows a schematic view of part of the method of FIG. 1 and of an optical detection unit and an output unit of the system of FIG. 1.
Figure 3:
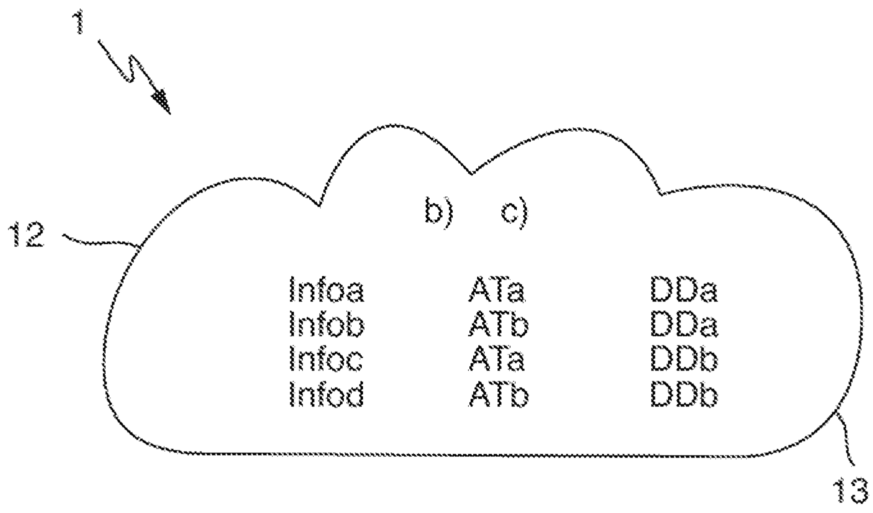
FIG. 3 shows a further schematic view of part of the method of FIG. 1 and of a classing unit and a determination unit of the system of FIG. 1.
Figure 4:
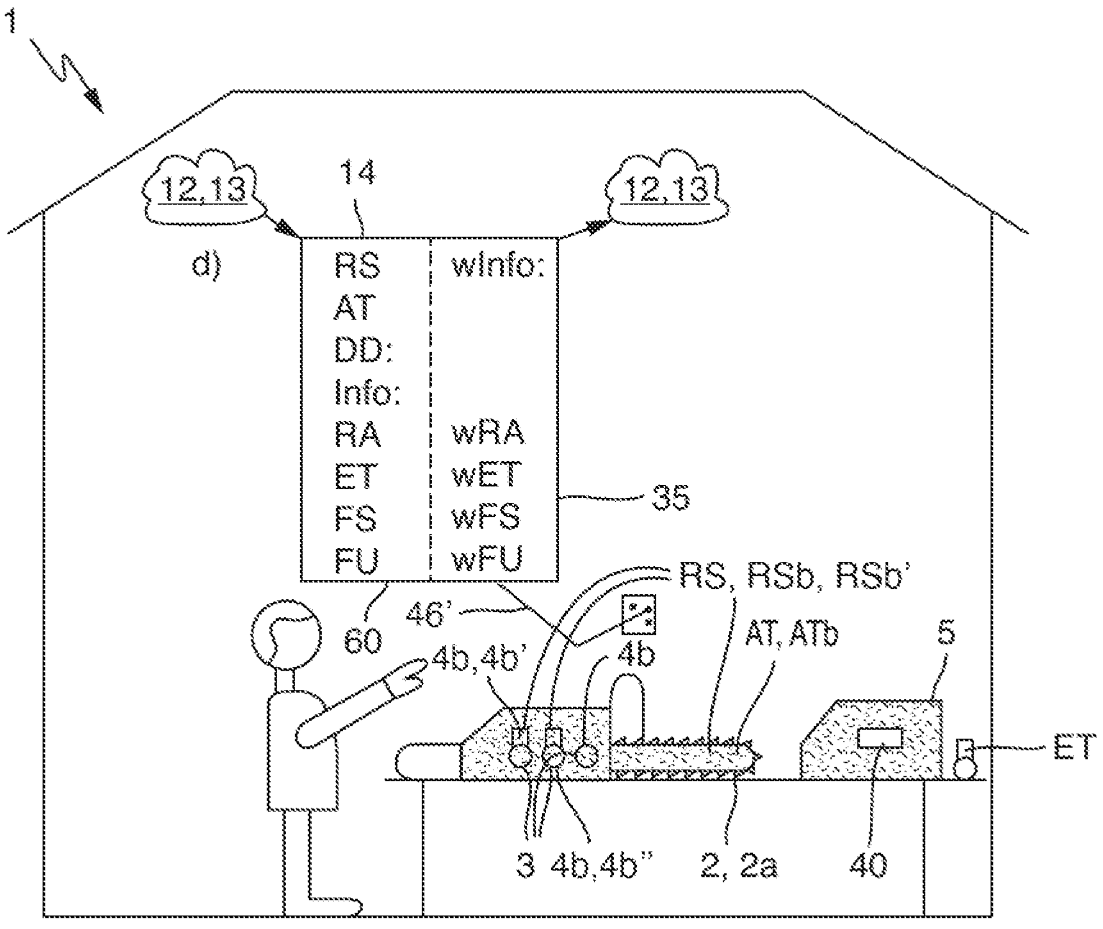
FIG. 4 shows yet another schematic view of part of the method of FIG. 1 and of a further output unit of the system of FIG. 1 and of a valve and/or sealing component, in particular of a fuel inlet valve and/or of a radial shaft seal, of a treatment tool of the system of FIG. 1 impacted by an abrasive dust residue.

The method involves the steps of: a) optically detecting the residue RS, in particular recording an image of the residue RS, in particular by way of the optical acquisition unit 11, as shown in FIGS. 1 and 2. b) Classing the detected residue RS in accordance with the type AT of the residue RS, in particular by way of image recognition and/or image comparison, in particular by way of the classing unit 12, as shown in FIGS. 1 and 3. c) Determining the cleaning, maintenance and/or repair information Info based on the classing, in particular by way of the determination unit 13, as shown in FIGS. 1 and 3. d) Outputting, in particular displaying, the determined cleaning, maintenance and/or repair information Info, in particular by way of the output unit 14, in particular to or for a user and/or a repairer of the treatment tool 2, as shown in FIGS. 1, 2 and 4.

In detail, the system 1 comprises a mobile device 15, in particular a smartphone. The device 15 comprises the optical detection unit 11 and/or the output unit 14, in the exemplary embodiment that is shown one of the output units 14, in particular a display.

The system 1 furthermore comprises an in particular stationary device 35, in particular a computer, in particular in a workshop, as shown in FIG. 4. The device 35 comprises one of the output units 14, in particular a display.

Furthermore, the detection unit 11 is a camera.

Also, the classing unit 12 is an image recognition and/or image comparison unit and/or the classing unit 12 and the determination unit 13 are a cloud server.

The detection unit 11 and the classing unit 12, in particular and the determination unit 13, are additionally designed to, in particular wirelessly, transmitting, in particular transmit, the residue RS, in particular the image of the residue RS.

The determination unit 13, in particular and the classing unit 12, are furthermore designed to, in particular wirelessly, transmitting, in particular transmit, the determined cleaning, maintenance and/or repair information Info.

The system 1 furthermore comprises the treatment tool 2.

In the exemplary embodiment that is shown, the treatment tool 2 is a saw 2*a*. In alternative exemplary embodiments, the treatment tool may be a pruner, a brush cutter, a hedge trimmer, a hedge cutter, a blower, a leaf blower, a set of pruning shears, an abrasive cutter, a sweeper, a sweeper roller, a sweeping brush, a lawnmower, a scarifier, a grass trimmer, a shredder, a stonecutter, a pressure washer or a spraying device and/or sprayer.

The treatment tool 2, in particular a motorized drive system 3 of the treatment tool 2, furthermore comprises different types of components 4*a*, 4*b*, 4*c*, as shown in FIGS. 4, 6, 9 and 12. Depending on the type ATa, ATb, ATc of the residue RSa, RSb, RSc and/or classing, the cleaning, maintenance and/or repair information Info differs in that the cleaning, maintenance and/or repair information Info is relevant, in particular type-specific, to one of the in particular types of components 4*a*, 4*b*, 4*c*.

Figure 6:
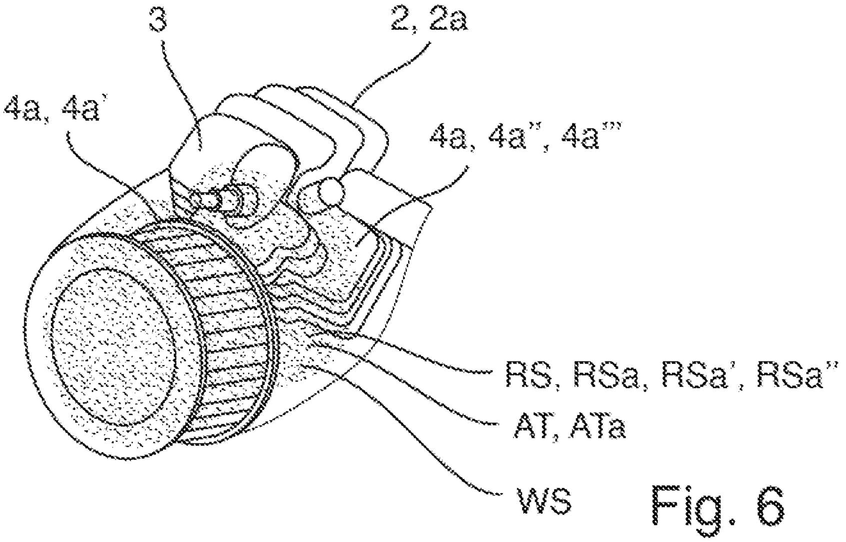
FIG. 6 shows a schematic view of a ventilation and/or cooling component, in particular of a preseparator on a fan wheel and/or of a heat sink, in particular cooling fins, on an engine cylinder, of the treatment tool of FIG. 1 impacted by a sap residue.
Figure 9:
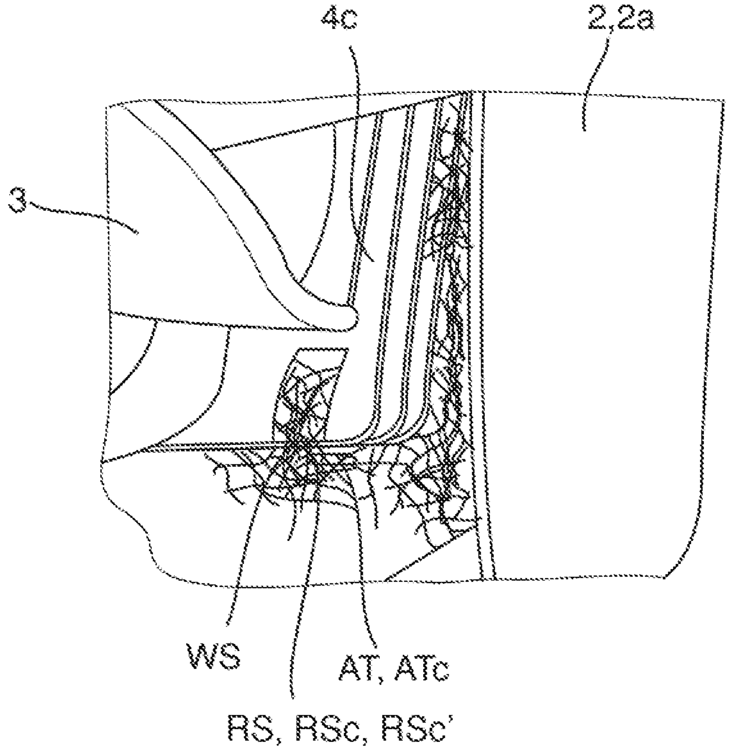
FIG. 9 shows a schematic view of an air guidance component, in particular on an engine cylinder, of the treatment tool of FIG. 1 impacted by a plant-based fiber residue.
Figure 10:
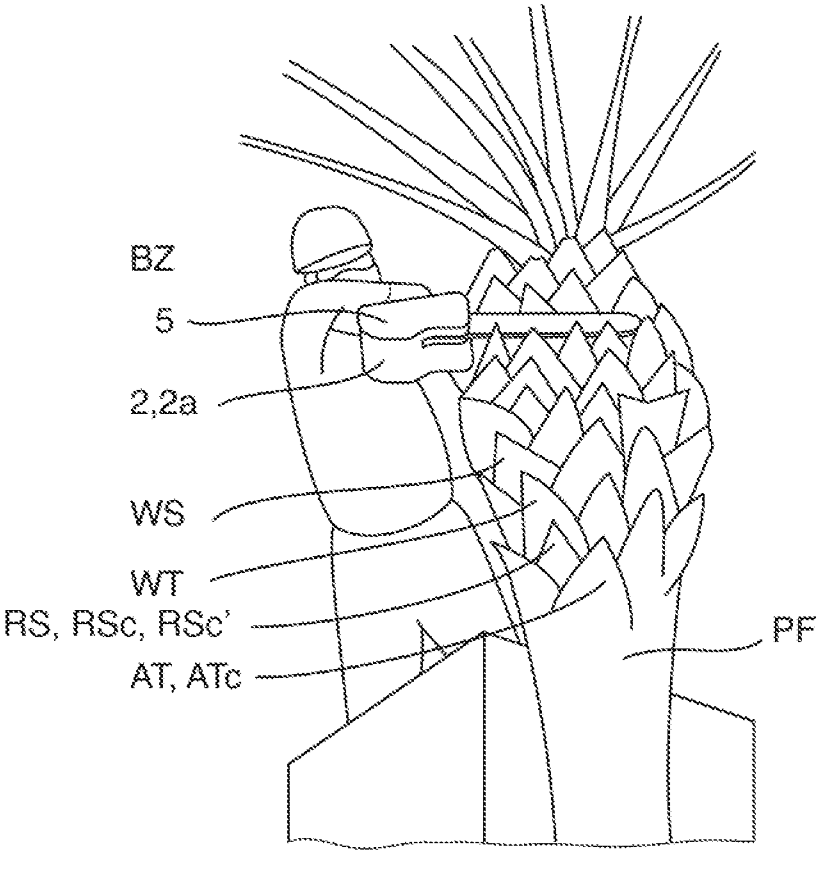
FIG. 10 shows a schematic view of treatment of a plant, in particular care of a palm tree, by way of the treatment tool of FIG. 1, causing a plant-based fiber residue.
Figure 11:
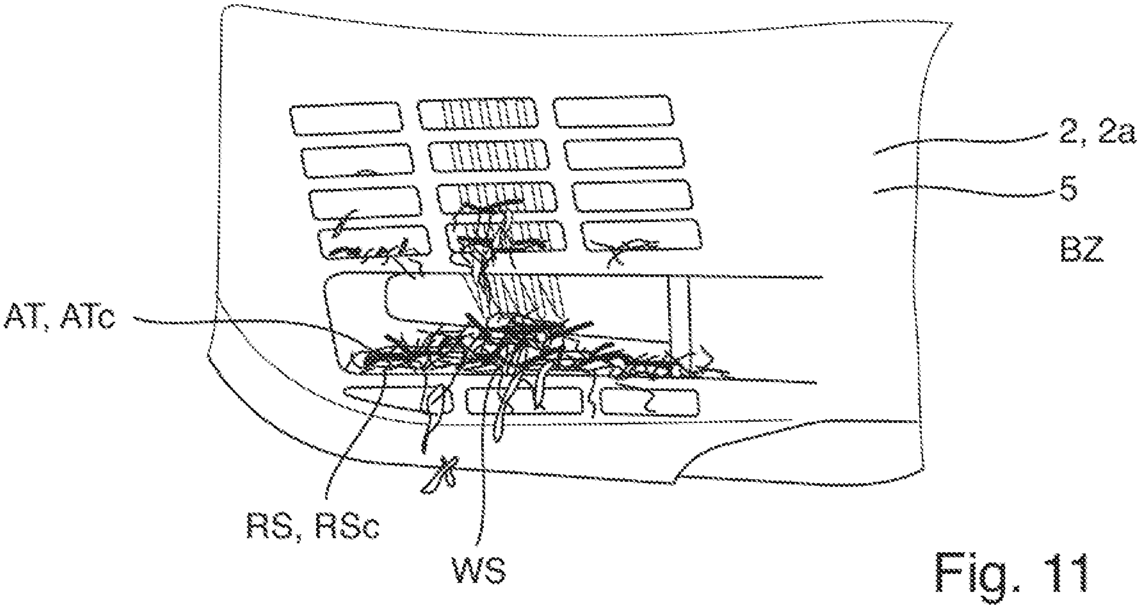
FIG. 11 shows a schematic view of a plant-based chip residue able to be detected externally optically on the treatment tool of FIG. 1.
Figure 12:
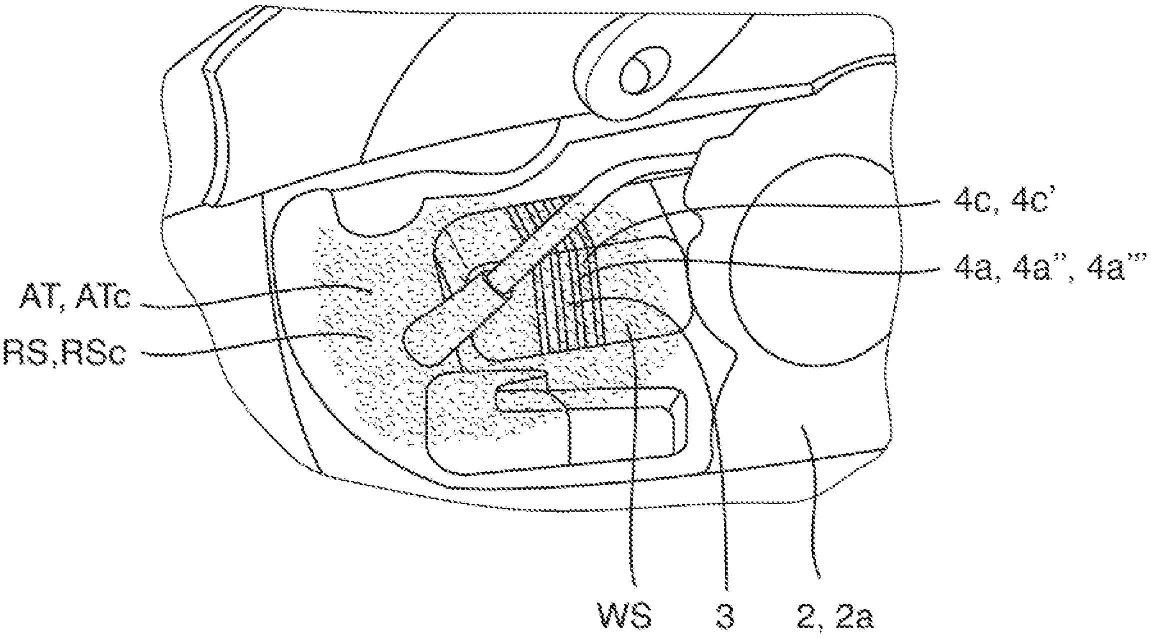
FIG. 12 shows a schematic view of an air guidance component, in particular on an engine cylinder and/or a silencer, of the treatment tool of FIG. 1 impacted by a plant-based chip residue.

In detail, the different types of components 4*a*, 4*b*, 4*c* include a ventilation and/or cooling component 4*a*, in particular a preseparator 4*a*' on a fan wheel and/or a heat sink 4*a*'', in particular cooling fins 4*a*''', on an engine cylinder, as shown in FIGS. 6 and 12, a valve and/or sealing component 4*b*, in particular a fuel inlet valve 4*b*' and/or a radial shaft seal 4*b*'', as shown in FIG. 4, and/or an air guidance component 4*c*, in particular on the engine cylinder and/or a silencer, as shown in FIGS. 9 and 12.

The treatment tool 2, in particular the motorized drive system 3 of the treatment tool 2, additionally comprises a, in particular the, number of components 4*a*, 4*b*, 4*c*. The number of components 4*a*, 4*b*, 4*c* is not able to be externally optically detected in an intended operating state BZ of the treatment tool 2, in particular is at least partially or completely concealed by a housing 5, in particular an external housing, of the treatment tool 2. The cleaning, maintenance and/or repair information Info is relevant to one of the number of components 4*a*, 4*b*, 4*c*.

In FIGS. 1, 5, 6 and 8 to 12, the residue RS of a material WS of a workpiece WT is caused by treatment of the workpiece WT by way of the treatment tool 2.

The workpiece WT is in particular a piece of a plant, in particular a tree and/or a piece of wood.

Figure 5:
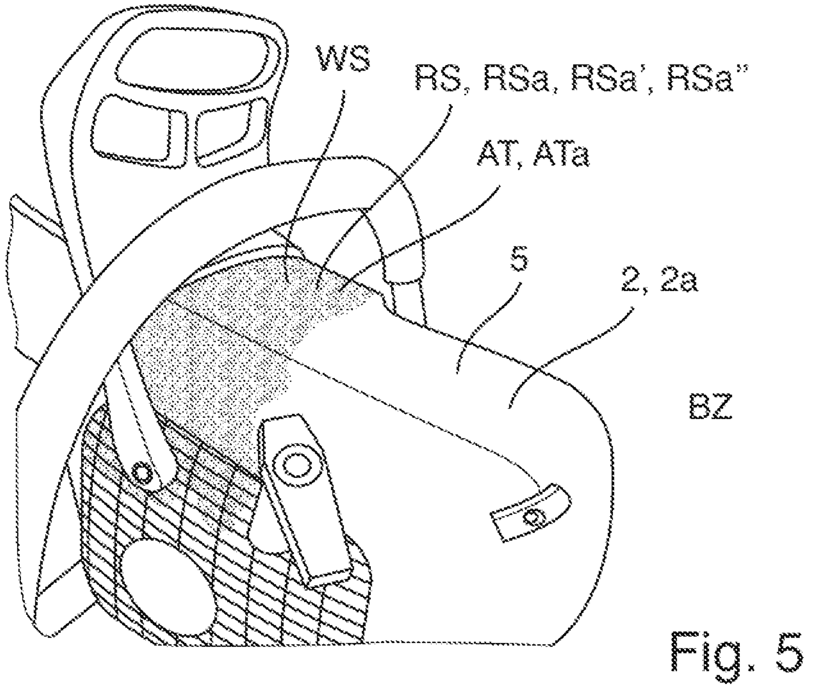
FIG. 5 shows a schematic view of a sap residue, in particular of a resin, in particular in connection with a plant-based dust, able to be detected externally optically on the treatment tool of FIG. 1.
Figure 7:
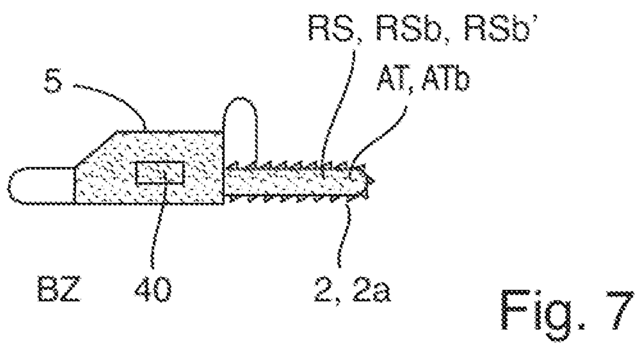
FIG. 7 shows a schematic view of an abrasive dust residue, in particular of a mineral dust, able to be detected externally optically on the treatment tool of FIG. 1.
Figure 8:
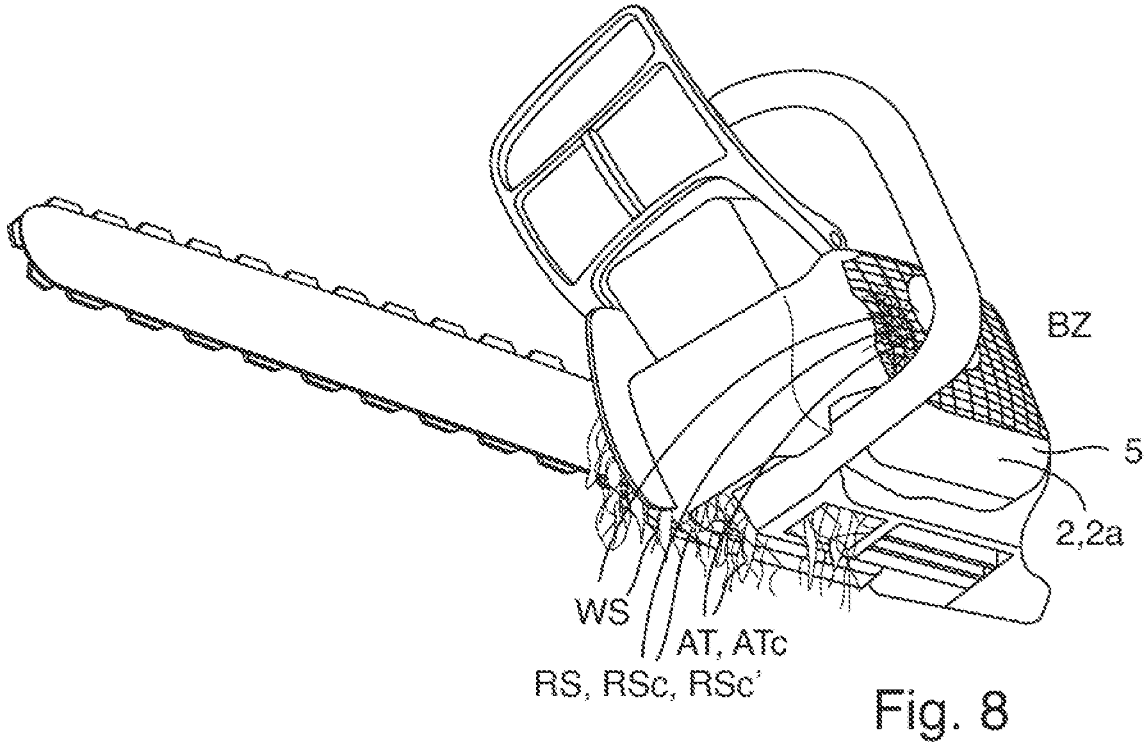
FIG. 8 shows a schematic view of a plant-based fiber residue, in particular in connection with dirt collected by a plant, able to be detected externally optically on the treatment tool of FIG. 1.

The residue RS is furthermore from a set of different types ATa, ATb, ATc of residues RSa, RSb, RSc. The different types ATa, ATb, ATc of residues RSa, RSb, RSc include a sap residue RSa, in particular a resin RSa', in particular in connection with a plant-based dust RSa", as shown in FIGS. 1, 5 and 6, an abrasive dust residue RSb, in particular a mineral dust RSb', as shown in FIGS. 4 and 7, and/or a plant-based fibre and/or plant-based chip residue RSc, in particular in connection with dirt RSc' collected by a plant PF, as shown in FIGS. 1 and 8 to 12.

The plant-based dust RSa" may in particular be an in particular black beetle-infested wood dust, as may typically occur when felling and debranching.

The abrasive dust residue RSb, in particular the mineral dust RSb', may occur due to stirring up when working near the ground, for example as often observed in Spain.

The plant-based fibre residue RSc, in particular in connection with the dirt RSc' collected by the plant PF, may occur when caring for palm trees. The palm trees may in particular collect the dirt RSc' in their trunks.

The plant-based chip residue RSc may be a coniferous woodchip residue and/or occur when cutting in particular large buttress roots, when debranching and when constructing log cabins.

A residue RSa of the same type ATa as the sap residue RSa may further impact the ventilation and/or cooling component 4*a*, in particular as far as the engine cylinder and/or at same, in particular stick thereto. This may in particular lead to a fault symptom FS in the form of running problems. Without cleaning, this may lead to insufficient cooling or overheating and thus to fault cause FU in the form of engine damage, in particular a piston seizure.

A residue RSb of the same type ATb as the abrasive dust residue RSb may impact the valve and/or sealing component 4*b*, in particular wear and/or loosen same.

A residue RSc of the same type ATc as the plant-based fibre and/or plant-based chip residue RSc may impact the air guidance component 4*c*, in particular at the engine cylinder and/or away therefrom, in particular jam or block or clog it. This may in particular lead to a fault symptom FS in the form of running problems. Without cleaning, this may lead to a buildup of heat and thus to overheating and thus to fault cause FU in the form of engine damage, in particular a piston seizure.

In the exemplary embodiment that is shown, the motorized drive system 3 is a combustion engine drive system. In alternative exemplary embodiments, the motorized drive system may, in addition or as an alternative, be an electric motor drive system. A component of the electric drive motor system may in particular comprise, in particular be, a magnetic core. In addition or as an alternative, the different types of residues may include a metal residue, in particular metal chips. A residue of the same type as the metal residue may in particular impact the component of the electric drive motor system, in particular the magnetic core, in particular stick thereto.

The method furthermore involves the step of: ascertaining, in particular acquiring, diagnostic data DD, in particular fault data FD, of the treatment tool 2. The ascertained diagnostic data DD are complementary to the detected residue RS and/or the classing. Step c) involves: determining the cleaning, maintenance and/or repair information Info by way of linking the ascertained diagnostic data DD and the classing, in particular by way of the determination unit 13.

In the exemplary embodiment that is shown, the treatment tool 2 includes a diagnostic data memory 40 for storing the diagnostic data DD, as shown in FIGS. 1 and 4. The determination unit 13 and the diagnostic data memory 40 are designed to, in particular wirelessly, transmit, in particular transmitting, the diagnostic data DD.

The diagnostic data DD may in particular indicate, in particular provide information about, in particular non-intended heating, in particular overheating, of the motorized drive system 3. By virtue of the link with the classing, in particular of the residue RSa and/or of the residue RSc, it is possible to determine the cleaning, maintenance and/or repair information Info, in particular relevant to the ventilation and/or cooling component 4*a* and/or the air guidance component 4*c*.

The diagnostic data DD may indicate, in particular provide information about, wear and/or looseness. By virtue of the link with the classing, in particular of the residue RSb, it is possible to determine the cleaning, maintenance and/or repair information Info, in particular relevant to the valve and/or sealing component 4*b*.

Step c) additionally involves: selecting the cleaning, maintenance and/or repair information Info from a set of different cleaning, maintenance and/or repair information Infoa, Infob, Infoc, Infod, in particular by way of the determination unit 13, as shown in FIG. 3. The cleaning, maintenance and/or repair information Infoa, Infob, Infoc, Infod is in each case assigned a type ATa, ATb of a residue RSa, RSb from a set of different types ATa, ATb of residues RSa, RSb, in particular and diagnostic data DDa, DDb from a set of different diagnostic data DDa, DDb.

The method furthermore involves the steps of: ascertaining, in particular acquiring, effective, in particular actual, cleaning, maintenance and/or repair information wInfo, as shown in FIG. 4. Assigning the type AT of the residue RS to the ascertained effective cleaning, maintenance and/or repair information wInfo for a next performance of the method, in particular by way of the determination unit 13.

In the exemplary embodiment that is shown, the repairer confirms or changes the effective cleaning, maintenance and/or repair information wInfo, in particular by actuating an input unit 60, in particular in the form of a touch screen, in particular of the system 1, in particular of the device 35.

The cleaning, maintenance and/or repair information Info furthermore comprises a cleaning, maintenance and/or repair operation instruction RA and/or a replacement part ET for the treatment tool 2 and/or a, in particular the, fault symptom FS and/or a, in particular the, fault cause FU of the treatment tool 2 and/or the relevant component 4*a*, 4*b*, 4*c*. In addition or as an alternative, the cleaning, maintenance and/or repair information may comprise an accessory part, in particular a name or a recommendation of the accessory part, such as for example an additional air filter grating, for the treatment tool.

The system 1 furthermore comprises a, in particular the, replacement part ET for the treatment tool 2.

As made clear by the exemplary embodiments shown and explained above, the invention provides an advantageous method for automatically ascertaining cleaning, maintenance and/or repair information for a motor-driven treatment tool and an advantageous system for automatically ascertaining cleaning, maintenance and/or repair information for a motor-driven treatment tool, in particular each having improved properties.

What is claimed is:

1. A method for automatically ascertaining cleaning, maintenance and/or repair information for a motor-driven treatment tool, wherein the treatment tool comprises a residue able to be detected externally optically caused during operation of the treatment tool, the method comprising the steps of:

a) optically detecting the residue on the motor-driven treatment tool;

b) classing the detected residue in accordance with a type of the residue;

c) determining the cleaning, maintenance and/or repair information based on the classing; and d) outputting the determined cleaning, maintenance and/or repair information.

2. The method according to claim 1, wherein the treatment tool comprises different types of components, wherein, depending on the type of the residue and/or classing, the cleaning, maintenance and/or repair information differs in that the cleaning, maintenance and/or repair information is relevant to one of the types of components.

3. The method according to claim 2, wherein a motorized drive system of the treatment tool comprises the different types of components.

4. The method according to claim 2, wherein the different types of components comprise a ventilation component, a cooling component, a valve, a sealing component, or an air guidance component.

5. The method according to claim 4, wherein the ventilation and/or cooling component comprises a preseparator on a fan wheel and/or a heat sink on an engine cylinder, wherein the valve and/or sealing component comprises a fuel inlet valve and/or a radial shaft seal, and/or wherein the air guidance component is on an air inlet, an engine cylinder and/or a silencer.

6. The method according to claim 2, wherein the cleaning, maintenance and/or repair information comprises a cleaning, maintenance and/or repair operation instruction, a replacement part for the treatment tool, a fault symptom and/or a fault cause of the treatment tool, and/or the relevant component.

7. The method according to claim 1, wherein the treatment tool comprises a number of components, wherein the number of components is not able to be externally optically detected in an intended operating state of the treatment tool due to a housing of the treatment tool, and wherein the cleaning, maintenance and/or repair information is relevant to one of the number of components.

8. The method according to claim 1, wherein the residue of a material of a workpiece is caused by treatment of the workpiece by way of the treatment tool.

9. The method according to claim 8, wherein the residue is from a set of different types of residues, wherein the different types of residues include a sap residue, an abrasive dust residue, a plant-based fiber residue, or a plant-based chip residue.

10. The method according to claim 9, wherein the sap residue is a resin in connection with a plant-based dust, wherein the abrasive dust residue is a mineral dust, and/or wherein the plant-based fiber or plant-based chip residue is in connection with dirt collected by a plant.

11. The method according to claim 1, wherein the treatment tool is one of: a saw, a pruner, a brush cutter, a hedge trimmer, a hedge cutter, a blower, a leaf blower, a set of pruning shears, an abrasive cutter, a sweeper, a sweeper roller, a sweeping brush, a lawnmower, a scarifier, a grass trimmer, a shredder, a stonecutter, a pressure washer or a spraying device and/or sprayer.

12. The method according to claim 1, further comprising the step of:

ascertaining diagnostic data of the treatment tool, wherein the ascertained diagnostic data are complementary to the detected residue and/or the classing, and wherein step c) comprises:

determining the cleaning, maintenance and/or repair information by way of linking the ascertained diagnostic data and the classing.

13. The method according to claim 12, wherein step c) comprises:

selecting the cleaning, maintenance and/or repair information from a set of different cleaning, maintenance and/or repair information, wherein the cleaning, maintenance and/or repair information is in each case assigned a type of a residue from a set of different types of residues and diagnostic data from a set of different diagnostic data.

14. The method according to claim 13, further comprising the steps of:

ascertaining effective cleaning, maintenance and/or repair information; and assigning the type of the residue to the ascertained effective cleaning, maintenance and/or repair information for a next performance of the method.

15. A system for automatically ascertaining cleaning, maintenance and/or repair information for a motor-driven treatment tool, wherein the treatment tool comprises a residue, able to be detected externally optically, caused during the operation of the treatment tool, the system comprising:

an optical detection unit, wherein the optical detection unit is designed to optically detect the residue on the motor-driven treatment tool;

a classing unit, wherein the classing unit is designed to class the detected residue in accordance with a type of the residue;

a determination unit, wherein the determination unit is designed to determine the cleaning, maintenance and/or repair information based on the classing; and an output unit, wherein the output unit is designed to output the determined cleaning, maintenance and/or repair information.

16. The system according to claim 15, further comprising:

a mobile device, wherein the mobile device comprises the optical detection unit and/or the output unit.

17. The system according to claim 16, further comprising:

the treatment tool and/or a replacement part for the treatment tool.

18. The system according to claim 15, further comprising:

the treatment tool and/or a replacement part for the treatment tool.

19. A method for automatically ascertaining cleaning, maintenance and/or repair information for a motor-driven treatment tool, wherein the treatment tool comprises a residue able to be detected externally optically caused during operation of the treatment tool, the method comprising the steps of:

a) optically detecting the residue on the motor-driven treatment tool, wherein the optically detecting comprises recording an image of the residue;

b) classing the detected residue in accordance with a type of the residue, wherein the classing comprises image recognition in a form of feature extraction and/or reduction;

c) determining the cleaning, maintenance and/or repair information based on the classing; and d) outputting the determined cleaning, maintenance and/or repair information, wherein the treatment tool comprises different types of components, and wherein, depending on the type of the residue and/or classing, the cleaning, maintenance and/or repair information differs in that the cleaning, maintenance and/or repair information is type-specific to one of the types of components, wherein a number of the components is not able to be externally optically detected in an intended operating state of the treatment tool, and wherein the cleaning, maintenance and/or repair information is relevant to one of the number of components.

* * * * *